United States Patent [19]

Kawamura

[11] Patent Number: 4,876,734

[45] Date of Patent: Oct. 24, 1989

[54] IMAGE SIGNAL PROCESSING METHOD AND APPARATUS

[75] Inventor: Kazushige Kawamura, Kanagawa, Japan

[73] Assignee: Fuji Photo Film Co., Ltd., Kanagawa, Japan

[21] Appl. No.: 198,272

[22] Filed: May 25, 1988

[30] Foreign Application Priority Data

May 25, 1987 [JP] Japan ............................... 62-125679

[51] Int. Cl.⁴ .............................................. G06K 9/44
[52] U.S. Cl. ....................................... 382/54; 382/52; 358/36; 358/37; 358/166; 358/167
[58] Field of Search ...................... 382/52, 54; 358/36, 358/37, 166, 167

[56] References Cited

U.S. PATENT DOCUMENTS

4,468,704 8/1984 Stoffel et al. ........................... 382/52
4,593,316 6/1986 Keller et al. ......................... 358/166

OTHER PUBLICATIONS

R. L. Sapirstein, "Improving Low-Illumination Video", NASA Tech. Briefs., Spring 1979, p. 18.

*Primary Examiner*—David K. Moore
*Assistant Examiner*—Yon Jung
*Attorney, Agent, or Firm*—Sughrue, Mion, Zinn, Macpeak & Seas

[57] ABSTRACT

In an image signal processing apparatus or method in which first picture element data for one image are added to second picture element data respectively to provide addition data for subsequently averaging, a first memory has memory regions for storing some of the first picture element data and an "empty" memory region for storing at least one picture element, a second memory has memory regions for storing the remaining first picture element data, a first operation is performed in which one of the second picture elements is added to a corresponding picture element output from the second memory, the result of the addition is stored in the empty region of the first memory, and the memory region thus emptied is selected as the next "empty" memory region, and a second operation is performed in which the next picture element of the second picture element data is added to a corresponding picture element data output from the first memory, the result of the addition is stored in the next "empty" memory region, and the memory region thus emptied is selected as the next empty memory region, and so on. The data provided by the addition operations are divided by the number of addition operations to provide the averaged data.

7 Claims, 3 Drawing Sheets

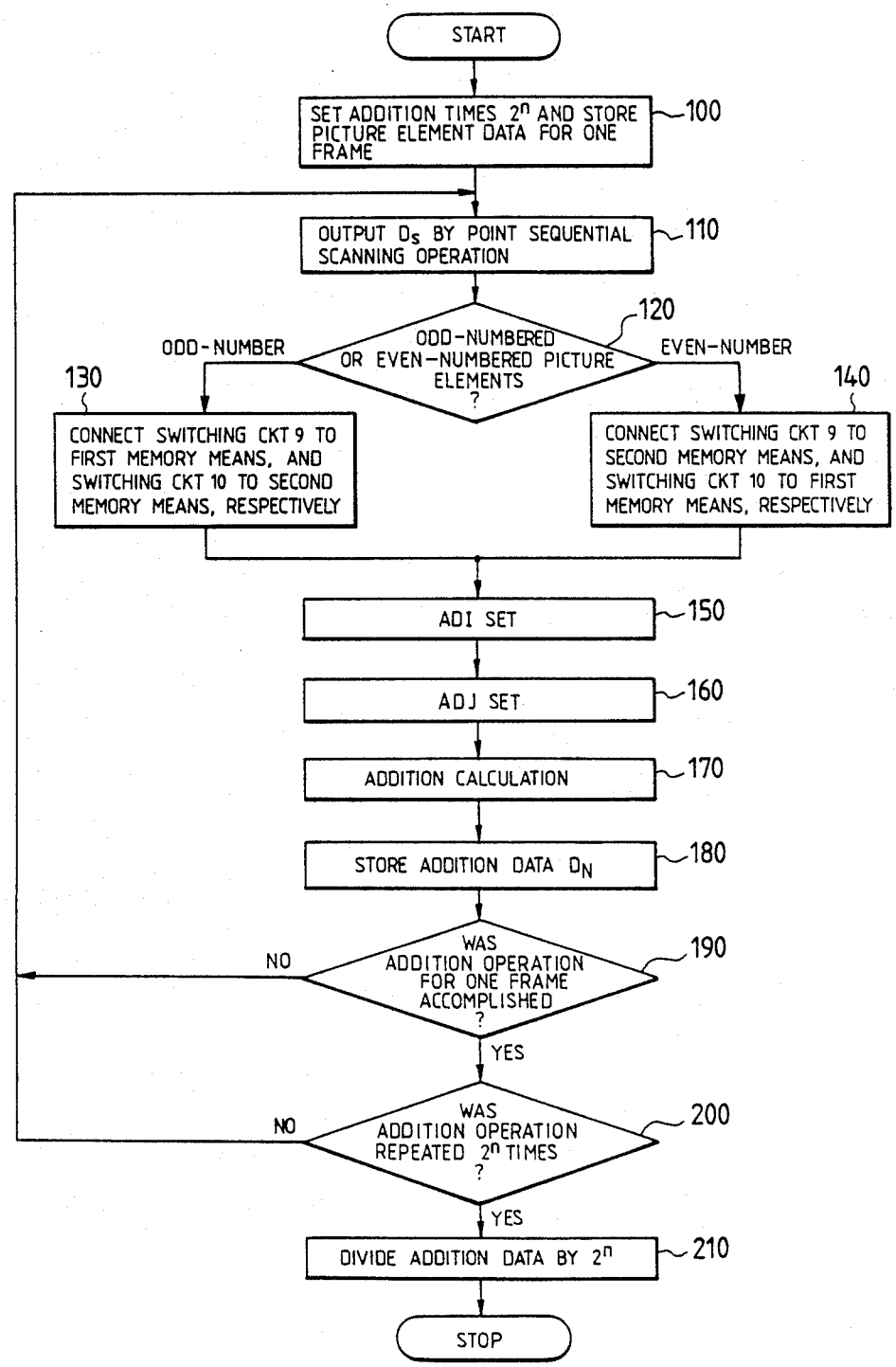

IMAGE SIGNAL PROCESSING METHOD AND APPARATUS

BACKGROUND OF THE INVENTION

This invention relates to an image signal processing method and an apparatus for practicing the method, namely, an image signal processing apparatus, and more particularly to an image signal processing method in which removal of noise components from image signals is carried out by averaging, and an apparatus for practicing the method.

An image processing technique of this type is important for image pickup devices in electronic cameras, such as in VTRs (video tape recorders) or for devices which supply reproduced image signals to a monitor.

A conventional image signal processing apparatus, as shown in FIG. 5, comprises: an A/D (analog-to-digital) converter to which picture element signals S are output, with predetermined timing, by the picture elements of an image pickup element provided, for instance, in an electronic camera; an adder 2 which adds picture element data $D_S$ output by the A/D converter 1 to picture element data $D_L$ provided by a first frame memory 3 or a second frame memory 4, and outputs operation data $D_N$ which is obtained by dividing the result of addition by two (2). the first and second frame memories 3 and 4 each having a data storage capacity of one frame; and switching circuits 5 and 6. The switching circuit 5 transmits the operation data $D_N$ to the first memory 3 or the second frame memory 4. The switching circuit 6 transmits the output data of the first frame memory 3 or that of the second frame memory 4, as the picture element data $D_L$, to the adder 2.

The operation of the image signal processing apparatus thus organized will be described.

It is assumed that picture element data for the frame one vertical scanning period have previously been stored in the second frame memory 4. After the switching circuits 5 and 6 are connected to the first frame memory 3 and the second frame memory 4, respectively, as shown in FIG. 5, application of a video signal S to the A/D converter 1 is started. As a result, picture element data $D_S$ is output sequentially, for instance, by the point sequential scanning of the image pickup elements, and this data are added to picture element data $D_L$ which are read out of the second frame memory 4, beginning with the top address, in synchronization with the point sequential scanning. The results of addition are divided by two (2), and are sequentially stored in the first frame memory 3 beginning with the top address. That is, operation data $D_N$ for one frame according to the following equation (1) are stored in the first frame memory 3:

$$D_N(i) = \tfrac{1}{2}(D_S(i) + D_L(i)) \tag{1}$$

where i is the memory address.

Thereafter, the switching circuits 5 and 6 are operated to select the second frame memory 4 and the first frame memory 3, respectively. As a result, similarly to the above-described case, picture element data $D_S$ for the frame in the next vertical scanning period are added to picture element data $D_L$ read out of the first frame memory 3, and the results of addition are divided by two (2), the resultant operation data $D_N$ being stored in the second frame memory 4. Thus, in conjunction with equation (1), $$D_N = (1/2^n) \sum_{i=1}^{M} D_N(i) \tag{2}$$

where n is the number of processing operations (in this case, n=2).

As was described above, one pair of frame memories 3 and 4 are provided so that new picture element data $D_S$ are added to old picture element data $D_L$. As a result, asynchronous noise components included in these data are removed so that the quality of the reproduced image is improved.

However, the above-described signal processing technique suffers from a difficulty that, as it is required to use a pair of large capacity frame memories, the image signal processing apparatus is unavoidably bulky.

SUMMARY OF THE INVENTION

Accordingly, an object of this invention is to eliminate the above-described difficulty accompanying a conventional image signal processing technique.

More specifically, an object of the invention is to provide an image signal processing apparatus which is smaller in size than, but equal in performance to the conventional image signal processing apparatus, and a corresponding image signal processing method.

The foregoing object and other objects of the invention have been achieved by the provision of an image signal processing apparatus in which, for image reproduction, first picture element data for one image are added to second picture element data for another image in accordance with the arrangement thereof to provide addition data, the addition data are averaged to provide averaged data, and the averaged data may be used as the first picture element data. In the invention, there are provided first memory means having memory regions for storing a given number of the first picture element data and an "empty" memory region for storing at least one picture element; second memory means having memory regions for storing the remaining first picture element data; control means for repeatedly performing: a first operation in which one of the second picture element data is added to picture element data read out from the second memory means in correspondence to the arrangement of the picture element data, data provided as a result of the addition is stored in the "empty" region of the first memory means, and the memory region of the second memory means which was just read out is selected as the next "empty" memory region; and a second operation in which the next picture element of the second picture element data is added to a picture element read out from the first memory means in correspondence to the arrangement of the picture element data, therein data provided as a result of the addition is stored in the next "empty" memory region in the second memory means, and the memory region of the first memory means which was just read out is selected as the latest empty memory region. Means is provided for dividing the addition data by the number of addition operations, to provide averaged data.

The invention provides an image signal processing method in which, for image reproduction, first picture element data for one image are added to second picture element data in accordance with the arrangement thereof to provide addition data the addition data are averaged to provide averaged data, and the averaged data are used as the first group of picture element data, in which, according to the invention, there are provided: first memory means having memory regions for storing a given number of the picture elements of the first picture element data and an "empty" memory region for storing at least one picture element; second memory means having memory regions for storing the remaining first picture element data and control means for repeatedly performing: a first operation in which one of the second picture element is added to a picture element outputted from the second memory means in correspondence to the arrangement of the picture element data therein data provided as a result of addition is stored in the "empty" memory region of the first memory means, and the memory region of the second memory means which was just read out is selected as the next "empty" memory region; and a second operation in which the next picture element of the second picture element data is added to picture element data read out from the first memory means in correspondence to the arrangement of the picture element data therein, data provided as a result of this addition is stored in the next "empty" memory region in the second memory means, and the memory region of the first memory means which was just read out is selected as the next "empty" memory region. The data provided by addition are divided by the number of addition operations, to provide averaged data.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a flow chart for description of the operation of the apparatus shown in FIG. 1.

DETAILED DESCRIPTION OF THE INVENTION

One preferred embodiment of this invention will be described with reference to the accompanying drawings.

Figure 1:
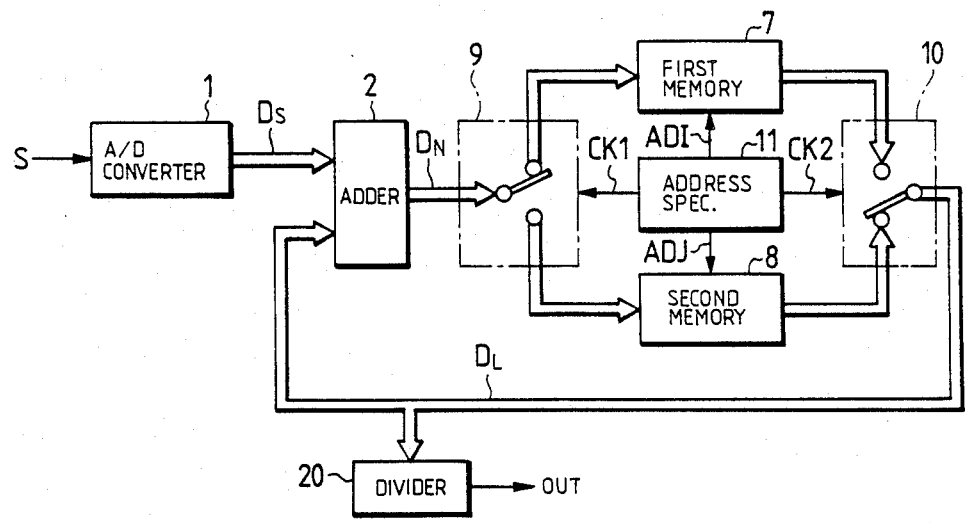
FIG. 1 is a block diagram showing the arrangement of one example of an image signal processing apparatus according to this invention.

One example of an image signal processing apparatus according to the invention, as shown in FIG. 1, comprises: an A/D (analog-to-digital) converter 1 for A/D converting video signals S provided by the picture elements of an image pickup element; an adder 2 for adding picture element data $D_S$ output by the A/D converter 1 to picture element data $D_L$ provided by first or second memory means 7 or 8, (described later in detail) the sum of the storage capacities of which corresponds substantially to the picture element data for one frame; and switching circuits 9 and 10. The switching circuit 9 transmits the output data $D_N$ of the adder 2 to the first memory means 7 or the second memory means 8. The switching circuit 10 transmits the output data of the first or second memory means 7 or 8, as the picture element data $D_L$, to the adder 2.

The image signal processing apparatus further comprises: address specifying means 11 for controlling the operations of the switching circuits 9 and 10 and specifying memory addresses for the first and second memory means 7 and 8. These control operations are carried out in synchronization with the read timing of a point sequential scanning operation, for instance, in reading video signals S from the picture elements of the image pickup element.

Figure 2:
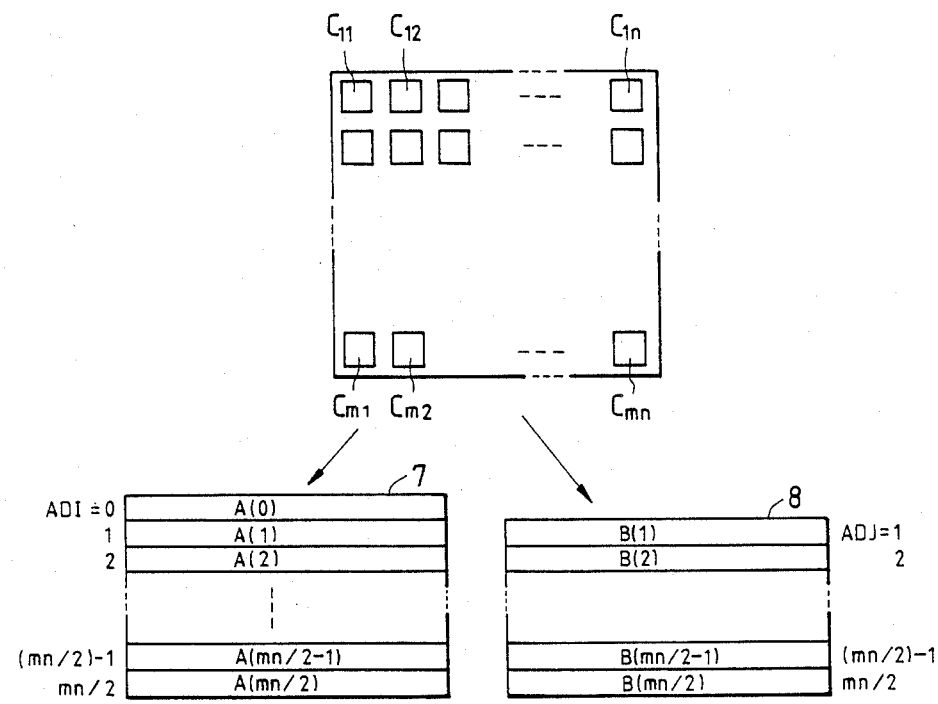
FIG. 2 is an explanatory diagram for description of the arrangement of the memory in the apparatus of the invention.

FIG. 2 is an explanatory diagram showing the arrangement of the memory regions of the first and second memory means 7 and 8 with respect to the picture elements for one frame. For instance, the solid image pickup element has m×n picture elements, as shown in FIG. 2. Picture element data provided by the odd-numbered picture elements $C_{11}, C_{13}, \ldots C_{21}, C_{23}, \ldots C_{m1}, C_{m3}, \ldots$ of the m×n picture elements are stored in correspondence to data $A(1), A(2), \ldots A(mn/2)$ in the memory regions indicated at ADI. whereas picture element data provided by the even-numbered picture elements $C_{12}, C_{14}, \ldots C_{22}, C_{24}, \ldots C_{m2}, C_{m4}, \ldots$ are stored in correspondence to data $B(1), B(2), \ldots B(mn/2)$ in the memory regions indicated at ADJ. To permit the output data $D_N$ of the adder 2 (FIG. 1) to be stored in this manner, the address specifying means 11 controls the operation of the switching circuit 9 and specifies addresses for the first or second memory means. The operations of the switching circuits 9 and 10 are controlled so that they may not select one and the same memory means 7 or 8 at the same time. For instance, when the armature of the switching circuit 9 is tripped over to the input side of the second memory means 8, the armature of the switching circuit 10 is tripped over to the output side of the first memory means 7. For convenience in description, the output data $D_S$ of the A/D converter 1 and the output data $D_N$ of the adder 2 will be referred to as $D_S(i,j)$ and $D_N(i,j)$ in correspondence to the arrangement of the picture elements, respectively.

The relationships of the address signal ADI and ADJ to the first and second memory means 7 and 8 will be described with reference to FIG. 3. When the data $D_S(1,1)$ provided by the picture element $C_{11}$ is output by the A/D converter 1, the armature of the switching circuit 9 is tripped over to the input side of the second memory means 8 and at the same time the address signal ADJ=1 is provided, whereas the armature of the switching circuit 10 is tripped over to the output side of the first memory means 7 and at the same time the address signal ADI=0 is provided. Accordingly, the adder 2 outputs the result $D_N(1,1)$ of the addition $(D_S(1,1)+B(1))$, which is stored in the first memory means 7 at the 0-th address. Similarly, when the data $D_S(1,2)$ provided by the picture element $C_{12}$ is output by the A/D converter 1, the armatures of the switching circuits 9 and 10 are connected to the second memory means 8 and the first memory means 7, respectively, whereas the address signals ADI=1 and ADJ=1 are provided. As a result, the adder 2 outputs the result $D_N(1,2)$ of the addition $(D_S(1,2)+A(1))$, which is stored in the second memory means 8 at the first (1st) address.

Figure 3:
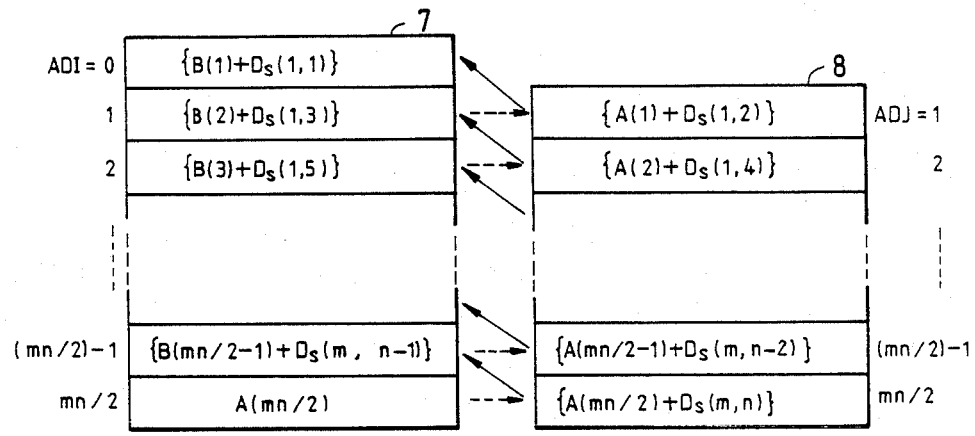
FIG. 3 is an explanatory diagram for a description of the operation of the memory.
Figure 5:
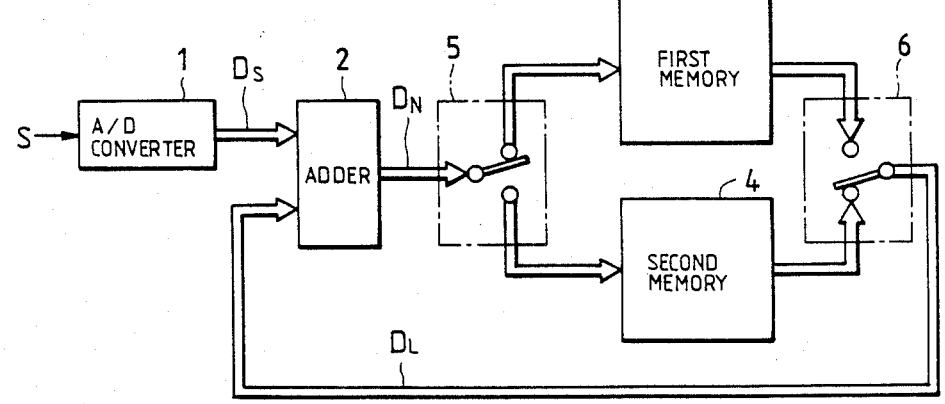
FIG. 5 is a block diagram showing the arrangement of a conventional prior art image signal processing apparatus.

The video data $D_S$ read sequentially are processed in the same manner, and the resultant operation data $D_N(i,j)$ are stored in the memory means 7 and 8 as shown in FIG. 3, while rewriting the old data.

The operation of the image signal processing apparatus will be described with reference to FIG. 4, a flow chart.

Upon start of the operation, in routine 100, the number of addition operations $2^n$ (n being a positive integer) is set, and the picture element data for one frame are stored in the first and second memory means 7 and 8. In the first data reading operation by scanning, the addition operation of adder 2 is temporarily suspended, and therefore the picture data are transferred directly so as to be stored as shown in FIG. 2. In this case, the region ADI=0 is empty.

In the following routine 110 picture element data $D_S(i,j)$ for the next frame are successively output by the point sequential scanning operation. In routine 120, it is determined whether the picture element data $D_S(i,j)$ are odd-numbered or even-numbered picture elements. According to the result of this determination, either routine 130 or 140 is effected. That is, when the picture element data are the odd-numbered picture elements, routine 130 is effected; whereas when the picture element data are the even-numbered picture elements, routine 140 is effected.

In routine 130, the armature of the switching circuit 9 is tripped over to the input side of the second memory means 8 while the armature of the switching circuit 10 is tripped over to the output side of the first memory means 7. In routine 140, the armature of the switching circuit 9 is tripped over to the input side of the first memory means 7, while the armature of the switching circuit 10 is tripped over to the output side of the second memory means 8.

In routines 150 and 160, the address signals ADI and ADJ for the first and second memory means 7 and 8 are sequentially set. In the case where the operation is carried out through routine 130, the signals ADI are used as data writing address signals for the second memory means 8 whereas the signals ADJ are used as data reading address signals for the first memory means 7. When the operation is carried out through routine 140, the use of these signals is opposite to that described above.

Thereafter, in routine 170, the adder 2 carries out the addition operation and in the next routine 180 the addition data $D_N(i,j)$ are stored in the address regions specified by the signals ADI and ADJ. The above-described operation is carried out whenever one (1) is added to one of the signals ADI or ADJ. When, in routine 190, it is determined that the addition operation for the picture element data for one frame has been accomplished, routine 200 is effected to determine whether or not routines 110 through 190 should be carried out again. That is, in routine 200, the addition operation is carried out again if $2^n$ is less than a set value. When the addition operation has been repeated $2^n$ times, routine 210 is effected. In routine 210, the addition data are divided by $2^n$, to obtain average data $D_N$ for the picture elements.

The case where the picture element data of the first and second memory means 7 and 8 are subjected to addition once will be described. The picture element data shown in FIG. 2 are stored as shown in FIG. 3. As is apparent from FIG. 3, the addition data $D_N(i,j)$ based on both the latest picture element data $D_S(i,j)$ obtained from the picture elements by scanning and the picture element data $D_L$ for the same picture elements one frame earlier, are sequentially stored in the next nearest address region (next to where the old picture element data which may be changed, was stored). Therefore, the same addition operation as in the conventional case can be achieved with less storage capacity. The operation of obtaining the average value can be achieved by using a divider 20 which reads and processes the addition data from first and second memory means 7 and 8.

On the other hand, in the case where the addition operation is to be carried out more than once ($n \geq 1$), the image signal processing operation is carried out according to the flow chart of FIG. 4 with the initially empty region specified by ADI=0 in the first signal processing operation, ADI=mn/2 in the second signal processing operation, ADI=(mn/2)−1 the third signal processing operation, ADI=(mn/2)−2 in the fourth signal processing operation, and so on.

The picture element data thus processed includes substantially no asynchronous noise components, and therefore the resultant reproduced image is high in picture quality.

As is apparent from the above description, the memory capacity required for the image signal processing apparatus of the invention to remove such noise components is about half of that required in the conventional image signal processing apparatus. This permits miniaturization of the image signal processing apparatus, and contributes greatly to a reduction of the manufacturing cost.

In the above-described embodiment, the first empty region is the address region specified by ADI=0; however, the invention is not limited thereto or thereby. That is, any one of the address regions may be selected as the first empty region so that the added data may be sequentially stored starting therefrom.

The picture element data thus processed are read out of the memory means 7 and 8 in a conventional manner to form video images.

As was described above, in the invention the picture element data provided through the addition operation are successively stored in "empty" regions. Therefore, in the image signal processing apparatus of the invention, the memory capacity may be reduced to about half of that required by the conventional image signal processing apparatus. This permits miniaturization of the apparatus.

What is claimed is:

1. An image signal processing apparatus in which first picture element data for one image are added to second picture element data for a second image in accordance with the data arrangement thereof to provide addition data, and said addition data are averaged to provide averaged data for use in image reproduction; comprising:

first memory means having memory regions a given number, less than all, of said elements of said first picture element data, an initial empty memory region for storing at least one picture element;
   second memory means having memory regions for storing the remaining first picture element data;
   control means for repeatedly performing:
   (1) a first operation in which one of said second picture elements is added to a picture element read out from said second memory means, data provided as a result of said addition is stored in said empty region of said first memory means, and the memory region of said second memory means thus read out is designated as the next empty memory region, and
   (2) a second operation in which the next picture element of said second picture element data is added to a picture element read out from said first memory means, data provided as a result of said addition is stored in said next empty memory region in said second memory means, and the memory region of said first memory means thus read out is selected as the next empty memory region; and means for dividing said addition data by the number of addition operations, to provide said averaged data.

2. In an image signal processing method in which first picture element data for one image are added to second picture element data to produce addition data, said addition data are averaged to provide averaged data, and said averaged data are used in image reproduction, the improvement comprising:

(1) providing first memory means having memory regions for storing a given number, less than all, of said picture elements of said first picture element data, and an initially empty memory region for storing at least one picture element;

(2) providing second memory means having memory regions for storing the remaining first picture element data;

(3) adding one of the picture elements of said second picture element data to a picture element read out from said second memory means;

(4) storing the sum in said empty memory region of said first memory means;

(5) selecting the memory region of said second memory means which was just read out as a next empty memory region;

(6) adding the next picture element of said second element data to a picture element read out from said first memory means;

(7) storing the sum in said next empty memory region in said second memory means;

(8) selecting the memory region of said first memory means which was just read out as the next empty memory region;

(9) repeating steps (3) through (8) until each picture element of said first picture element data has been subjected to at least one addition operation; and

(10) dividing said sums by the number of addition operations, to provide said averaged data.

3. An apparatus as claimed in claim 1, wherein each of said first and second memory means has a capacity of approximately one-half of a frame of video data.

4. An apparatus as claimed in claim 1, wherein said first and second memory means comprise ping-pong memories having interleaved among themselves one frame of video data and at least one circulating free memory location constituting said empty memory region.

5. An apparatus as claimed in claim 4, further including A/D converter means for receiving and converting input video data, and wherein said control means comprises adder means receiving an output of said converter means as a first input thereof, first switch means for alternatingly coupling said adder means to one of said first and second memory means, respectively, and second switch means for alternatingly coupling the other of said first and second memory means, respectively, to a second input of said adder means.

6. An apparatus as claimed in claim 5, further including addressing control means for controlling said first and second switch means and for alternating read and write cycles with respect to each said memory means.

7. An apparatus as claimed in claim 6, wherein said addressing control means sequentially steps through addresses for memory locations of each said memory means, and performs a read operation and a write operation on each memory location before advancing to the next address in each memory means.

* * * * *